(12) United States Patent
Jokinen et al.

(10) Patent No.: US 8,725,152 B2
(45) Date of Patent: May 13, 2014

(54) MEASUREMENT REPORTING OF NEIGHBOR CELLS

(75) Inventors: Harri Jokinen, Salo (FI); Jurgen Hofmann, Merching, DE (US)

(73) Assignee: Nokia Corporation, Espoo (FI)

( * ) Notice: Subject to any disclaimer, the term of this patent is extended or adjusted under 35 U.S.C. 154(b) by 246 days.

(21) Appl. No.: 13/128,590

(22) PCT Filed: Nov. 10, 2009

(86) PCT No.: PCT/FI2009/050903
§ 371 (c)(1),
(2), (4) Date: Jun. 28, 2011

(87) PCT Pub. No.: WO2010/052376
PCT Pub. Date: May 14, 2010

(65) Prior Publication Data
US 2011/0281587 A1    Nov. 17, 2011

Related U.S. Application Data

(60) Provisional application No. 61/198,859, filed on Nov. 10, 2008.

(51) Int. Cl.
*H04W 36/00* (2009.01)
*H04W 4/00* (2009.01)

(52) U.S. Cl.
USPC ........... 455/436; 455/437; 455/438; 455/439; 370/331; 370/332

(58) Field of Classification Search
CPC ..................................................... H04W 36/30
USPC ....................................................... 455/436
See application file for complete search history.

(56) References Cited

U.S. PATENT DOCUMENTS

2007/0259671 A1* 11/2007 Cheng et al. ............... 455/452.2
2009/0047960 A1*  2/2009 Gunnarsson et al. ......... 455/436

FOREIGN PATENT DOCUMENTS

WO        2010052376        5/2010

OTHER PUBLICATIONS

"Measurement Reporting for GERAN/E-UTRAN Interworking", 3GPP TSG GERAN2 # 38bis, G2-080368, Agenda Item 5.3.3, Nokia Corporation and Nokia Siemens Networks, Jun. 24-27, 2008, pp. 1-7.
"On Measurement Reporting for GERAN/E-UTRAN Interworking", 3GPP TSG GERAN #39, GP-081159, Agenda Item 7.1.5.8, Nokia Corporation and Nokia Siemens Networks, Aug. 25-29, 2008, pp. 1-4.

(Continued)

*Primary Examiner* — Huy C Ho
(74) *Attorney, Agent, or Firm* — Alston & Bird LLP

(57) ABSTRACT

At a user equipment, individual ones of a set of measurements of neighbor cells are associated with individual code points which are relative to a threshold (301) and define a step size (303) that is dynamically determined from a set of possible step sizes. The code points to which the measurements are associated are compiled into a measurement report which is sent to a network. At the network, the code point step size (303) is sent to the user equipment which sends the measurement report to the network. The step size is thus dynamically determined from a set of possible step sizes. The network selects, based on the received measurement report, one of the neighbor cells for handover of the user equipment. In an embodiment, the threshold (301) is determined from an offset value sent by the network to the user equipment. Methods, apparatus, and stored computer programs are described for both user equipment and network side embodiments.

20 Claims, 7 Drawing Sheets

(56) References Cited

OTHER PUBLICATIONS

"LTE Measurement reporting in GSM", 3GPP TSG-RAN WG4 Meeting #48bis, R4-082446, Agenda Item: 6.1.7.1, Sep. 29-Oct. 3, 5 Pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.6.0, Sep. 2008, pp. 1-137.
"Enhanced Measurement Reporting for LTE", 3GPP TSG GERAN2#39bis, G2-080510, Agenda Item 5.3.3, Sep. 30-Oct. 3, 2008, pp. 1-4.
International Search Report and Written Opinion received for corresponding Patent Cooperation Treaty Application No. PCT/FI2009/050903, dated Feb. 10, 2010, 16 pages.
International Preliminary Report on Patentability received for corresponding Patent Cooperation Treaty Application No. PCT/FI2009/050903, dated May 19, 2011, 9 pages.
Office action received for corresponding Singaporean Patent Application No. 201103306-5, dated Mar. 5, 2012, 6 pages.
Office action received for corresponding Mexico Patent Application No. MX/a/2011/004895, dated Apr. 26, 2012, 2 pages of Office action.
Office Action received for corresponding Mexican Patent Application No. MX/a/2011/004895, dated Oct. 16, 2012, 4 pages. (Translation also attached).
Office Action received for corresponding Chile Patent Application No. 01036-2011, dated May 9, 2011, 10 pages. (Translation also attached).
Office Action received for corresponding Russian Patent Application No. 2011122415, dated Sep. 24, 2012, 8 pages. (Translation also attached).
Office Action received for corresponding Ukraine Patent Application No. 2011 06922, dated Sep. 11, 2012, 4 pages. (Translation also attached).
"LS on Reporting E-UTRAN Measurements(Draft)", 3GPP TSG GERAN, TSGG#38(08)1347, Meeting No. 39, Agenda Item 7.1.6, Release 8, Aug. 25-29, 2008, 2 Pages.
Office Action received for corresponding Australian Patent Application No. 2009312680, dated Feb. 13, 2013, 3 pages.
Office Action received for corresponding Chile Patent Application No. 01036-2011, dated Mar. 8, 2013, 6 pages of Office Action , No. English Language Translation available.
Office Action received for corresponding Japanese Patent Application No. 2011-535146, dated Feb. 27, 2013, 3 pages of Office Action and 4 pages of office action translation.
Office Action received for corresponding Korean Patent Application No. 2011-7013204, dated Dec. 26, 2012, 3 pages of Office Action, No English Language Translation available.
Office Action received for corresponding Kazakhstan Patent Application No. 201115571, dated Apr. 8, 2013, 6 pages of Office Action and 5 pages of Office Action translation.
Office Action for Chinese Application No. 2009-80144419.1 dated Dec. 5, 2013.
Office Action for Japanese Application No. 2011-535146 dated Dec. 11, 2013.
Office Action for Korean Application No. 10-2013-7021284 dated Oct. 31, 2013.
Office Action for Canadian Application No. 2,742,198 dated Aug. 14, 2013.

* cited by examiner

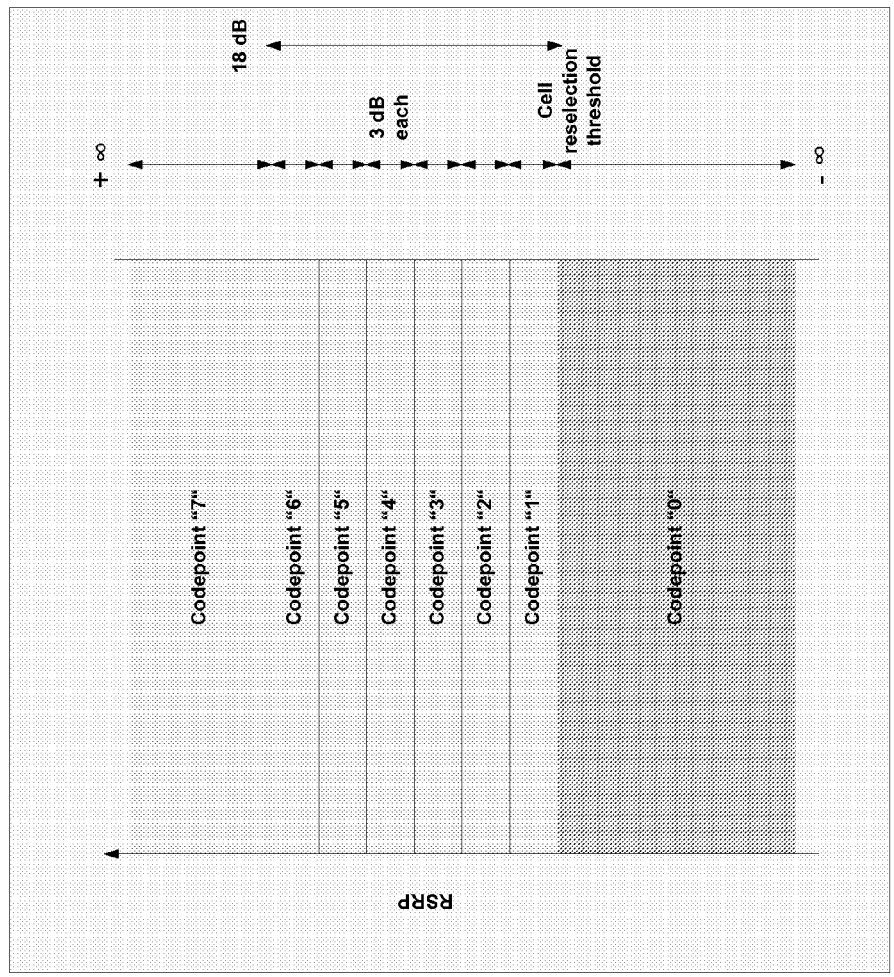
Fig. 2: Reproduction of Fig. 1 from GP-081159 showing exemplary RSRP encoding for E-UTRAN measurement reporting taking into account reduced reporting resolution of 3 bits

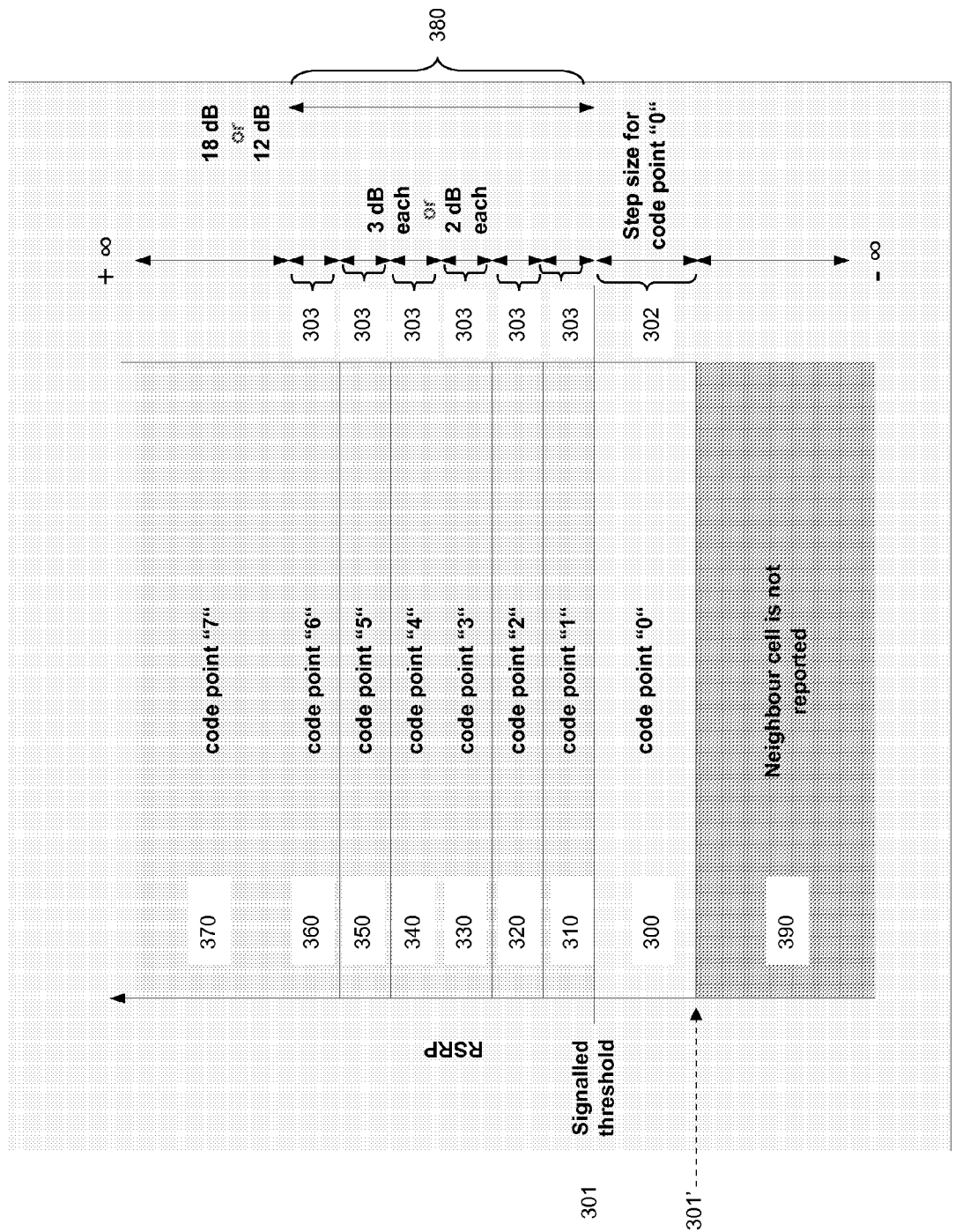

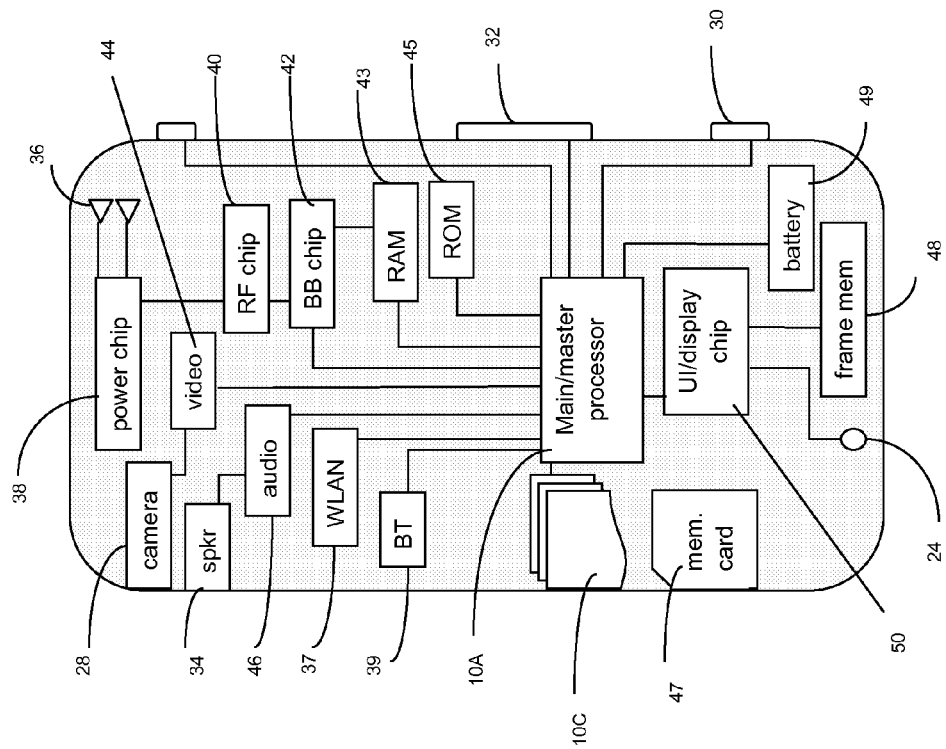
Fig. 4B
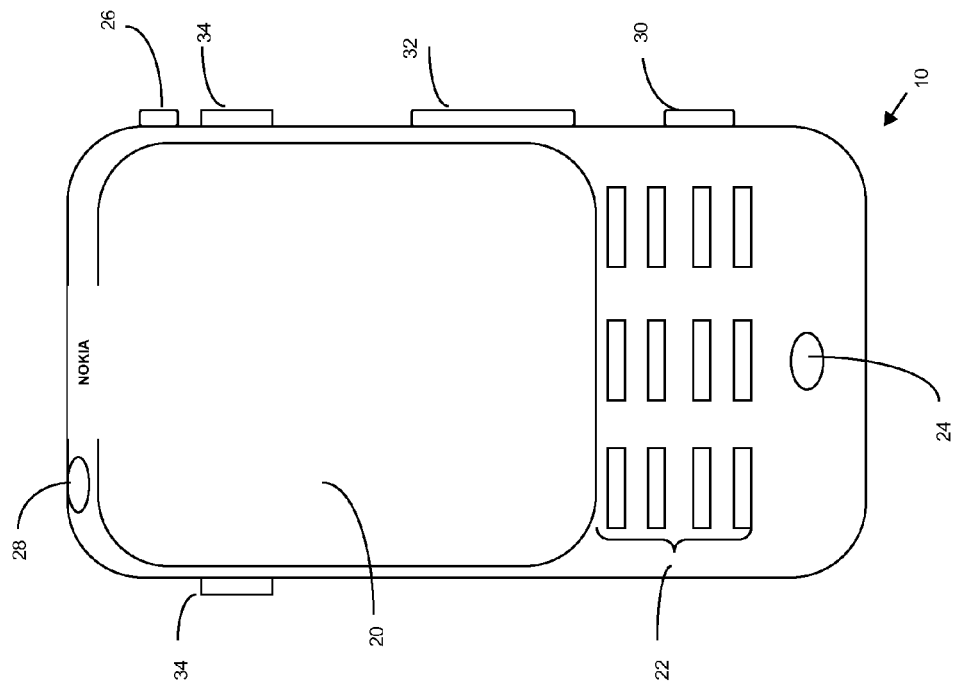

MEASUREMENT REPORTING OF NEIGHBOR CELLS

RELATED APPLICATION

This application was originally filed as PCT Application No. PCT/FI2009/1050903 filed Nov. 10, 2009, which claims priority benefit from U.S. Provisional Patent Application No. 61/198,859, filed Nov. 10, 2008.

TECHNICAL FIELD

The exemplary and non-limiting embodiments of this invention relate generally to wireless communication systems, methods, devices and computer programs and, more specifically, relate to measurement reporting of neighbor cells in a wireless communication system; particularly inter-RAT cell measurements (e.g., reporting E-UTRAN cells in GERAN).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BCCH broadcast control channel
BSC base station controller
BSIC base station identity code
BSS base station subsystem
BTS base transceiver station
DL downlink (BTS/eNB towards UE)
EDGE enhanced data rates for GSM evolution
eNB EUTRAN Node B (evolved Node B, a base station/access node)
E-UTRAN evolved UMTS radio access network (also termed LTE/3.9G)
FDD frequency division duplex
GERAN GSM/EDGE radio access network (also known as 2.5G)
GSM global system for mobile communications
ID identity
LTE long term evolution
MS mobile station (also termed UE)
NB node B (a base station/access node)
PCID physical layer cell ID
RAT radio access technology
RSRP reference signal received power
RSRQ reference signal received quality
SC-FDMA single carrier, frequency division multiple access
TDD time division duplex
TTI transmission time interval
UE user equipment (also termed MS)
UL uplink (UE towards eNB)
UMTS universal mobile telecommunication system
UTRAN UMTS radio access network (also known as 3G)
A communication system known as evolved UTRAN (E-UTRAN, also referred to as UTRAN-LTE or as E-UTRA) is currently under development within the 3GPP. As presently specified the DL access technique will be orthogonal frequency division multiple access (OFDMA), and the UL access technique will be single carrier, frequency division multiple access (SC-FDMA).

One specification of interest is 3GPP TS 36.300, V8.6.0 (2008-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

FIG. 1 is a schematic diagram of a mobile station MS under control of a base transceiver station BTS of a GERAN system over an Um link. In the GERAN system the BTSs are under control of a base station controller BSC which communicates with the GSM/UMTS core network via at least the Gb and A interfaces as shown. Also at FIG. 1 there are shown six neighbor access nodes, some of which are GERAN BTSs, some of which are UTRAN NBs and some of which are E-UTRAN eNBs. The MS measures the serving GERAN BTS with which it has the Um interface and also measures the neighbor access nodes of whatever radio access technology RAT the MS is compatible, and sends to the serving BTS a measurement report. Similarly, the MS may instead be under control of the UTRAN network and send its measurement reports of its serving UTRAN NB and also of the neighboring GERAN BTSs and E-UTRAN eNBs to the serving NB of the UTRAN network. Either of these inter-RAT measurement reports is an exemplary but non-limiting environment for embodiments of these teachings With the adoption of E-UTRAN as a new radio technology RAT, there is a need to develop inter-working between pre-existing RATs to enable mobile terminals to operate within both legacy and E-UTRAN infrastructure systems such as the environment depicted at FIG. 1 and the measurement reporting of neighbor cells by a user equipment UE (shown in FIG. 1 as the MS). Measurement Reporting for E-UTRAN cells identifies an important aspect for GERAN/E-UTRAN inter-working, subject to be standardized in 3GPP Release 8.

Due to the agreement at GERAN #38bis (see Exhibit A attached to the priority document U.S. Provisional Patent Application No. 61/198,859, filed Nov. 10, 2008): document G2-080368 entitled MEASUREMENT REPORTING FOR GERAN/E-UTRAN INTER-WORKING; 3GPP TSG GERAN2#38bis, Xi'an, China; Jun. 24-27, 2008; by Nokia Corporation & Nokia Siemens Networks) to employ the approach of a black list for E-UTRAN neighbor cells, (see particularly Section 3 of that document which states that only neighbor cells are signaled which should not be considered as handover or cell reselection candidate), the ID's of allowed cells are not explicitly broadcasted and hence the mobile unit cannot simply index a cell in the measurement report, as is possible in the white list approach used for state-of-the-art neighbor cell reporting for GERAN or UTRAN cells.

This means that the full physical layer cell identity (PCID) of the E-UTRAN cell needs to be included in the measurement report. This is seen to reduce the efficiency of neighbor cell measurement reporting for E-UTRAN cells. Regardless of whether this black list approach will be more or less efficient in practice, it is the agreed framework for moving forward for inter-RAT measurement reporting. Consequently, the design of new measurement reporting messages is necessary to obtain the best reporting efficiency.

In order to keep impact of the introduction of E-UTRAN low on the mobile terminals, GERAN is envisaging to reuse legacy measurement report message formats, such as MEA- SUREMENT REPORT or ENHANCED MEASUREMENT REPORT in the dedicated mode or dual transfer mode; and PACKET MEASUREMENT REPORT or PACKET ENHANCED MEASUREMENT REPORT in the packet transfer mode also in the case of GERAN to E-UTRAN interworking.

By the reuse of existing measurement report message formats, restrictions on the reporting itself are naturally imposed in order to fit into these pre-existing formats. In particular, the ID of an E-UTRAN cell is represented by the PCID, requiring 9 bits which is 3 bits more than used for the BSIC identity in GERAN. Consequently the measurement reporting quantity of 6 bits as used for reporting on GERAN or UTRAN cells needs to be truncated to 3 bits to allow for this approach when reporting on the E-UTRAN cells. Further detail in this regard may be seen at section 4 of the above document G2-080368 and in sections 2.4 and 3 in the document G2-080510 entitled ENHANCED MEASUREMENT REPORTING FOR LTE; 3GPP TSG GERAN2#39bis, Sophia-Antipolis, France, Sep. 30-Oct. 3, 2008; by Nokia Corporation & Nokia Siemens Networks).

The reduced granularity of the reporting quantity is currently under discussion in 3GPP between GERAN and RAN 4; the reporting quality can only be three bits. See Exhibit B attached to the above referenced priority document: document TSGG #38 (08)1347 entitled LS ON REPORTING E-UTRAN MEASUREMENTS; 3GPP TSG GERAN Meeting No. 39, Florence, Italy; 25-29 Aug. 2008), where the reporting quantity may be either RSRP (Reference Signal Received Power) or RSRQ (Reference Signal Received Quality).

A contribution to GERAN has provided a basic solution for employing a reduced 3 bit granularity reporting for E-UTRAN cells. See Exhibit C attached to the above referenced priority document: document GP-081159 entitled ON MEASUREMENT REPORTING FOR GERAN/E-UTRAN INTERWORKING; 3GPP TSG GRAN #39, Florence, Italy; 25-29 Aug. 2008; by Nokia Siemens Networks & Nokia Corporation. One principle of the proposed encoding of the 3 bit measurement quantity is provided in FIG. 1 of document GP-081159, which is reproduced herein as FIG. 2.

SUMMARY

In accordance with a first aspect of the invention there is a method comprising: associating individual ones of a set of measurements of neighbor cells with individual code points, in which the code points are relative to a threshold and define a step size that is dynamically determined from a set of possible step sizes; compiling the code points to which the measurements are associated into a measurement report; and sending the measurement report to a network.

In accordance with a second aspect of the invention there is a memory storing a program of computer readable instructions that when executed by a processor result in actions comprising: associating individual ones of a set of measurements of neighbor cells with individual code points, in which the code points are relative to a threshold and define a step size that is dynamically determined from a set of possible step sizes; and compiling the code points to which the measurements are associated into a measurement report.

In accordance with a third aspect of the invention there is an apparatus comprising at least one processor and a memory storing computer readable instructions. The at least one memory and the computer readable instructions are configured, with the at least one processor, to cause the apparatus at least to perform: associating individual ones of a set of measurements of neighbor cells with individual code points, in which the code points are relative to a threshold and define a step size that is dynamically determined from a set of possible step sizes; compiling the code points to which the measurements are associated into a measurement report; and sending the measurement report to a network.

In accordance with a fourth aspect of the invention there is an apparatus comprising processing means and sending means. The processing means is for associating individual ones of a set of measurements of neighbor cells with individual code points, in which the code points are relative to a threshold and define a step size that is dynamically determined from a set of possible step sizes, and for compiling the code points to which the measurements are associated into a measurement report. The sending means is for sending the measurement report to a network. In a particular embodiment, the processing means comprises at least one processor and the sending means comprises at least one transmitter.

In accordance with a fifth aspect of the invention there is a method comprising: sending a code point step size selected from a set of possible step sizes to a user equipment; receiving from the user equipment a measurement report that comprises a set of code points each of which is associated with individual ones of a set of measurements of neighbor cells, in which the code points are relative to a threshold; and selecting, based on the received measurement report, one of the neighbor cells for handover of the user equipment from which the measurement report is received.

In accordance with a sixth aspect of the invention there is a memory storing a program of computer readable instructions that when executed by a processor result in actions comprising: sending a code point step size selected from a set of possible step sizes to a user equipment; receiving from the user equipment a measurement report that comprises a set of code points each of which is associated with individual ones of a set of measurements of neighbor cells, in which the code points are relative to a threshold; and selecting, based on the received measurement report, one of the neighbor cells for handover of the user equipment from which the measurement report is received.

In accordance with a seventh aspect of the invention there is an apparatus comprising at least one processor and a memory storing computer readable instructions. The at least one memory and the computer readable instructions are configured, with the at least one processor, to cause the apparatus at least to perform: sending a code point step size selected from a set of possible step sizes to a user equipment; receiving from the user equipment a measurement report that comprises a set of code points each of which is associated with individual ones of a set of measurements of neighbor cells, in which the code points are relative to a threshold; and selecting, based on the received measurement report, one of the neighbor cells for handover of the user equipment from which the measurement report is received.

In accordance with a eighth aspect of the invention there is an apparatus comprising sending means and receiving means and processing means. The sending means is for sending a code point step size selected from a set of possible step sizes to a user equipment. The receiving means is for receiving from the user equipment a measurement report that comprises a set of code points each of which is associated with individual ones of a set of measurements of neighbor cells, in which the code points are relative to a threshold. And the processing means is for selecting, based on the received measurement report, one of the neighbor cells for handover of the user equipment from which the measurement report is received.

These and other aspects of the invention are detailed below with particularity.

BRIEF DESCRIPTION OF THE DRAWINGS

FIG. 2 is a reproduction of FIG. 1 of document GP-081159 showing RSRP encoding for E-UTRAN measurement reporting taking into account reduced reporting resolution of 3 bits.

FIG. 3 is a code point diagram similar to FIG. 2 showing: variable step size reporting resolution; reporting of code point "0"; and variable step size for code point "0"; all according to an exemplary embodiment of this invention.

FIG. 4B shows a more particularized block diagram of a user equipment such as that shown at FIG. 4A.

DETAILED DESCRIPTION

Figure 1:
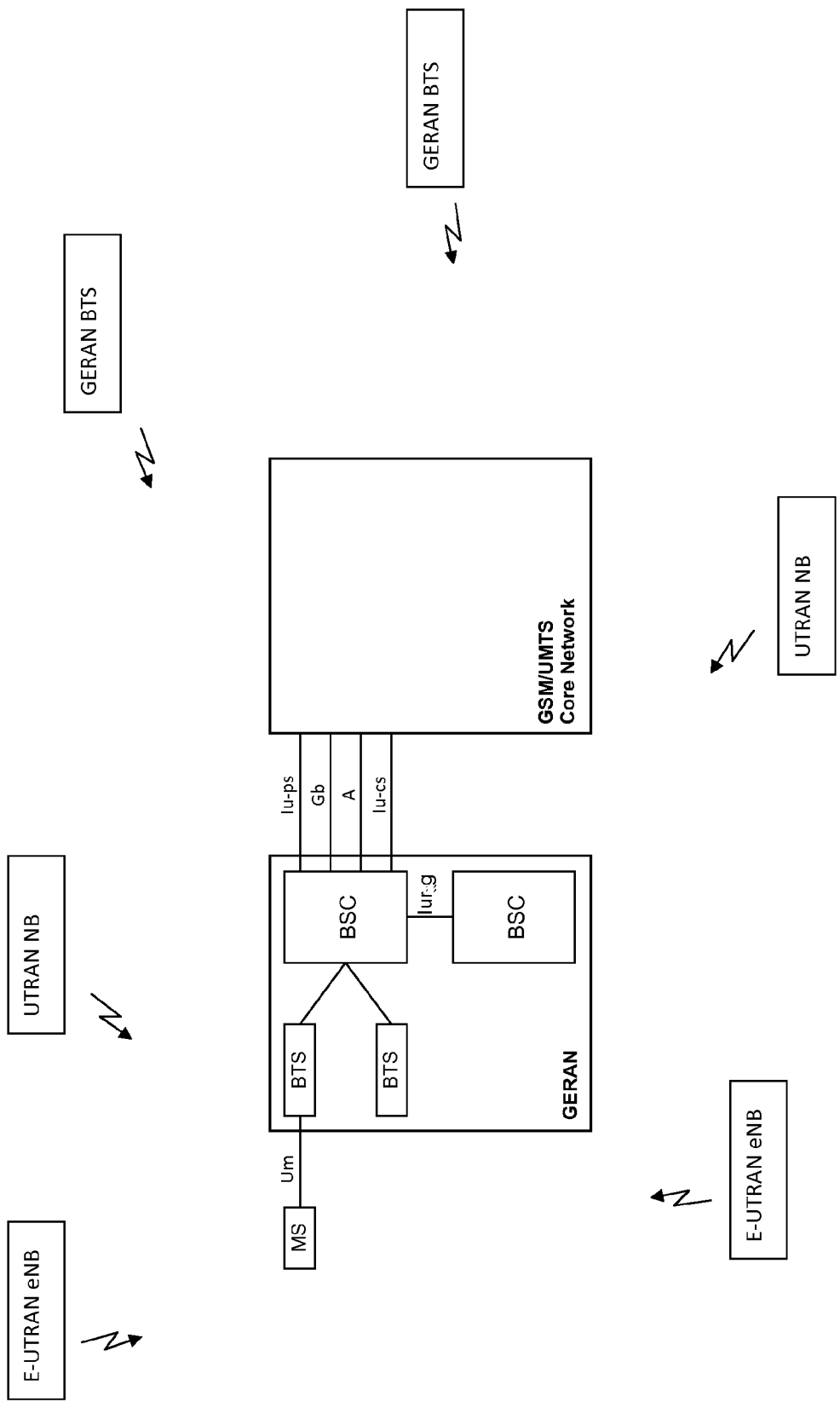
FIG. 1 illustrates a GERAN system architecture in which some neighbor access nodes to the MS are compliant with the GERAN system and other neighbor access nodes to the same MS are compliant with the E-UTRAN system.

In order to facilitate inter-working among GERAN and E-UTRAN, the existing GERAN messages: MEASUREMENT REPORT, PACKET MEASUREMENT REPORT, ENHANCED PACKET MEASUREMENT REPORT, and the PACKET ENHANCED MEASUREMENT REPORT are considered for use by mobile terminals/UEs that have both GERAN and E-UTRAN capability. As noted above, there is to be a blacklist approach by which any network cell (access node) that is not on the blacklist but that is using an explicitly provided frequency is to be considered by the UE to be a valid candidate for handover (in dedicated mode or dual transfer mode) or for cell reselection (in packet transfer mode) of the UE, should handover or cell reselection become necessary. To support such a handover or cell reselection the UE is to send measurement reports to its serving access node (e.g., a GERAN BTS or UTRAN NB), according to any one of the above formats, of those neighbor cells not on the blacklist and which are using at least one of the explicitly provided frequencies. The center frequency in E-UTRAN implicitly describes whether the cell using that center frequency is operating in the time division duplex TDD mode or the frequency division duplex FDD mode.

In the dedicated mode or dual transfer mode, the measurement report using the MEASUREMENT REPORT message format is to be 16 octets in length, and will carry measurement reports on the serving cell and up to six neighbor cells of any radio access technology RAT for evaluation by the serving cell for handover of the UE. At the present, the agreed measurement results within the measurement report are RSRP with 98 code points and RSRQ with 34 code points, yielding 7 bits for reporting RSRP with one bit resolution or 6 bits for reporting RSRQ. Based on signalled information by the serving cell, either RSRP or RSRQ is to be reported by the UE. In this case the other measurement quantity needs to be above a predefined threshold (handover or cell reselection threshold) which the serving cell broadcasts to UEs in its cell on a broadcast channel BCCH.

In case the RSRP shall be reported and RSRQ is above the predefined threshold for handover or cell reselection code point "0" is assigned to the RSRP range below the signaling threshold as can be seen at FIG. 2 and in the prior art is considered to be not viable as a handover candidate and so are not reported. Code points "1" to "6" cover a range of RSRP above the signaling threshold, and as shown at FIG. 2 since each has a proposed resolution of 3 dB, the range they cover is 18 dB. Code point "7" covers the RSRP range beyond 18 dB above the signaled threshold and is considered to represent the most viable handover candidate. Clearly the least resolution is currently provided for reporting cells at code point "7", higher resolution for code points "1" through "6", and just the indication that RSRP falls below the signaling threshold for code point "0" being always reported to the serving cell. For the case in which the RSRQ shall be reported and the RSRP is above the predefined threshold for handover or cell reselection the same type of encoding is foreseen for RSRQ.

With the 3-bit reporting granularity shown herein at FIG. 2, there are seen the following problems:

a. The cell reselection threshold signaled on the BCCH is valid for idle mode UEs and may not be suitable for active mode UEs for identifying a handover candidate. Hence such a threshold should be independently defined and should be signaled to the mobile terminal/UE via dedicated signaling (e.g. using MEASUREMENT INFORMATION message). Relevant teachings in this regard may be seen at document R4-082446 attached to the above referenced priority document as Exhibit D, entitled: LTE MEASUREMENT REPORTING IN GSM; 3GPP SG-RAN WG4 Meeting #48bis; Edinburgh, United Kingdom; 29 Sep.-3 Oct. 2008; by Nokia Corporation & Nokia Siemens Networks).

b. In FIG. 2 attached hereto the code point "0" refers to the range below the indicated signaled cell reselection threshold. Hence this code point reflects a cell which is not considered suitable as a handover candidate for a UE in the active mode. However no differentiation is done whether the reported neighbor cell is close to the threshold or far below that threshold. The network is denied information whether a neighbor cell is measured by the UE to be very near but below the threshold or far below the threshold. Also, a cell with this code point is always reported and hence reduces signaling capacity for other cells (E-UTRAN, GERAN or UTRAN cells) to be reported.

c. The report uses a fixed reporting step size (here 3 dB for code points "1" to "6" are signalled with 3 bit). This is beneficial if the reporting range covers 18 dB or more, but not optimum if it is lower and cells are closer to each other where the step size of 3 dB is too imprecise.

d. The reporting range can be different for different E-UTRAN carrier frequencies. This is not yet taken into account in the prior art (see for example document GP-081159, attached to the priority document as Exhibit C).

Most contributions in this area have assumed
to either use ENHANCED MEASUREMENT REPORTING allowing for a 6 bit resolution of the reporting quantity (however this feature is not widely used in GERAN networks); or
to define new measurement reporting messages (however at GERAN#39 it was agreed to investigate first the feasibility of reusing existing messages for E-UTRAN neighbor cell reporting before specifying new messages).

Related to the problems at points b to d above, the exemplary embodiments of these teachings provide four different aspects which may be combined in any of various combinations or employed individually. Stated generally, these aspects include: 1) modifying the code point "0" so that it covers the reporting range directly below the reporting threshold; 2) below code point "0" the E-UTRAN neighbor cell is not reported at all; 3) there is an adaptive reporting step size (e.g., a range of measurement values that one code point encompasses) to the inter-RAT measurement report; and 4) there is signaling on a per-E-UTRAN basis (center frequency basis) for aspects 1) through 3) above. These four aspects are detailed with particularity below with reference to FIG. 3.

The code point "0" (ref #300) is modified, in that it covers the reported range directly below the cell reselection/handover threshold (ref #301) with a predefined fixed step size. The step size 302 of code point "0" (ref #300) may in one embodiment be hard coded, or in another embodiment it may be signaled by the network, or in still a further embodiment it may be the same as the step size 303 for the remaining code points. In an exemplary embodiment such as that shown at FIG. 3, all of the code points (1 through 6) have the same step size 303 except for one or both of the highest (7) and the lowest (0) code points.

This aspect is shown in the distinction between FIGS. 2 and 3: in both those figures code point "0" is reported to the serving cell. The lighter shading and the darker shading indicates whether the neighbour cell that is assigned the code point "0" shall be considered as a valid candidate for handover or cell reselection (light) or not (dark) by the serving cell. At FIG. 2 the code point "0" is darkened; it is reported but not considered as valid handover or cell reselection candidate, for the simple reason that it is below the predetermined threshold 301. But in FIG. 3 the code point "0" (ref #300) is lightened and so it is reported by the UE to indicate to the serving cell that it is close although still below the predetermined handover threshold 301 but may be considered as a valid handover or cell reselection candidate due to the averaging process in the serving cell. Generally the signaled threshold 301 is signaled by the network/BTS to the various UEs in the cell. The signaled threshold could alternatively point to the code point "0" nominal value or the code point "0" lower start range value or to any other point that unambiguously defines the actual range of each code point.

Code point "0" (ref #300) is always reported by the UE for a particular E-UTRAN neighbor cell despite the fact that it is below the handover or cell reselection reporting threshold 301. One technical advantage of this is that the network could make use of this reported code point "0" from the various UEs for averaging.

As noted briefly above, the predefined threshold may be implemented in various ways. In one embodiment there is a nominal value which is signaled, such as for code point "0", from which the predetermined cell reselection or handover threshold 301 is offset. In another embodiment the signaled threshold is a border value (dB) between code point "0" and code point "1". In this case the predetermined threshold that is signaled, shown directly at FIG. 3 as threshold 301, is the actual cell reselection/handover threshold and there is no offset from the signaled threshold. And in still another embodiment the signaled threshold is a lower border value of the code point "0" reporting range (which in FIG. 3 would be the value between ref #s 300 and 390, shown as 301'). Each of these may be signaled by the network to the UE, and each represents different implementations of the network's signaling from which the predetermined threshold is determined in the UE. For the case where the signaled value or threshold is not the actual predetermined cell reselection/handover threshold 301 then the UE determines the cell reselection/handover threshold as offset from the signaled predetermined threshold that it receives. For example, in FIG. 3 the network may signal the value corresponding to 301', from which the UE offsets to find the predetermined threshold shown at 301 as the cell reselection/handover threshold.

In the second aspect summarized above, below code point "0" an E-UTRAN neighbor cell is not reported at all as is shown by the darker shading at FIG. 3 and ref #390. This is because it is so far below the handover or cell reselection threshold 301 (it is spaced by at least the step size 302 of code point "0" at ref #300) that it is not considered as a suitable handover candidate. One technical advantage of this non-reporting is to make room for GERAN cells (or for additional UTRAN or other RAT cells) for the case where reporting of these E-UTRAN cells 390 below code point "0" (ref #300) are not viable for handover anyway.

According to the third aspect of the invention summarized above, the report uses an adaptive reporting step size 303 which FIG. 3 shows to be variable between 2 dB and 3 dB (as a non-limiting example). In one embodiment of this third aspect the reporting step size 303 may be commanded by the network, based on, e.g., the network's evaluation of previous E-UTRAN measurement reports that it has received. In another embodiment of this third aspect the reporting step size 303 may be derived by the mobile station/UE from the range 380 of the measurement quantity related to the E-UTRAN neighbour cell to be reported (e.g., RSRP or RSRQ), without explicit signaling of that step size 303 from the network.

Consider an example for this third aspect of the invention. If two reporting step sizes 303 for RSRP are defined (e.g. 2 dB and 3 dB), the mobile station/UE decides based on the range 380 of RSRP values to use either 3 dB or 2 dB reporting step size 303. In one example this decision is particularly based on the number of reports bearing code point "7" (ref #370) for different E-UTRAN neighbor cells. The UE may indicate the unique reporting step size 303 for code points "1" to "6" to the network. For instance if more than one measurement report would obtain code point "7" (ref #370) with 2 dB step encoding, then a 3 dB step encoding is selected for step sizes 303 for code points "1" to "6" (and possibly also for code point "0" if that is to be the same as steps 303) to provide a better resolution for the strongest received neighbor cells.

It is noted that for the embodiment in which the network commands the step size (ref #303) via signaling, such an algorithm as described immediately above for the UE would run in the access node/base station instead of in the UE and the access node would then signal the determined step size to the UEs in the cell.

According to the fourth aspect of the invention summarized above, since the reporting range 380 can be different for different E-UTRAN carrier frequencies, e.g. in case of a macrocell layer on a first frequency (frequency 1) and a microcell layer on a second frequency (frequency 2), then the first through third aspects (either all three combined, any pair, or any one aspect individually) would then be signaled on a per E-UTRAN center frequency basis, i.e. the signaled threshold ("reporting range 380 lower reference point" representing the signalled threshold 301), the code point "0" step size 302, and the signaled code point "1" to "6" step size (ref #303) whether in DL or in UL.

Broadly stated, embodiments of the invention provide the technical benefit of using compressed encoding of measurement quantities which thereby improve efficiency of measurement reporting, provided the number of reported cells can be increased. These technical benefits can also be used for UTRAN and other mobile radio air interfaces to improve measurement reporting efficiency.

The (limited) reporting range may in some embodiments be set so that the actual handover/cell reselection threshold lies be in the middle of the range, or at least close to the midpoint. This can be reached irrespectively if the reference is set to code point zero nominal value or as shown at FIG. 3. This approach is seen to give the least distortion to the averaged values at the eNB at the exact handover/cell reselection decision point. The measurements naturally fluctuate, and if the handover/cell reselection threshold were exactly at the border of code point zero, it is anticipated that a situation might arise where a few reports may be missed when the natural signal fluctuations go a bit below the code point zero range.

Since the step size is dynamically controlled according to certain embodiments presented herein, it may be most straightforward to define the reporting range reference level for a code point zero nominal value, then code points n (e.g., 1 to 7) would have a nominal value of code point zero plus n times the granularity (e.g. 2 or 3 dB) detailed above. The reporting range for each code point would then be from the nominal value minus one half of the step size to the nominal value plus one half of the step size, wherein either the lower is included and the higher is excluded or vice versa, except that for the highest code point (code point 7) the range would extend to infinity. Here the lowest code point would have the same range as those above.

Consider an example of the above. If the nominal values were from −90 dBm to −76 dBm (2 dB steps), each code point covering a reported range of +/−1 dB around the nominal value, the threshold may be defined to point to −90 dBm (code point zero nominal value), −89 dBm (as in FIG. 3, the border level between code points 0 and 1) or almost equally any other code point within the reporting range. In theory this could also extend beyond the reporting range. So there are many ways to implement these teachings, whether the signaled value is at a border of two code points, or at the handover/cell reselection threshold, or at the mid-point of one or more reporting ranges. An important concept is that the signaled value sets some predetermined threshold from which the step sizes and the range of code point "0" are then found.

Since the parameter signaled from the network to the UE that sets the reporting ranges and the handover threshold can point anywhere as the above examples make clear, it may instead be termed a "reporting range threshold parameter" rather than a handover threshold parameter so as to avoid the implication that it must in every embodiment indicate the handover/cell reselection threshold directly.

Figure 4A:
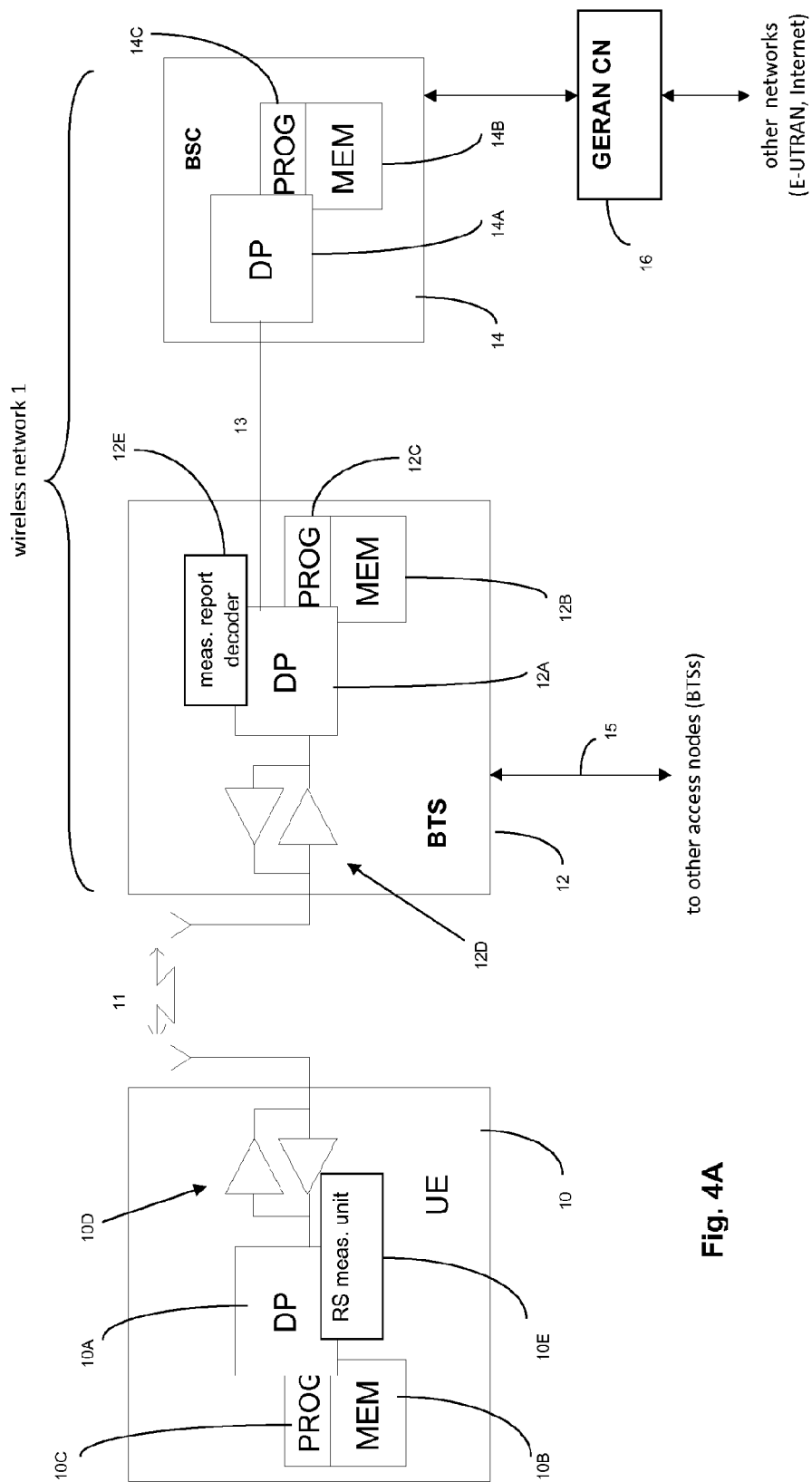
FIG. 4A shows a simplified block diagram of various electronic devices that are suitable for use in practicing the exemplary embodiments of this invention.

Reference is made to FIG. 4A for illustrating a simplified block diagram of various electronic devices and apparatus that are suitable for use in practicing any one or more of the above four aspects of this invention and their various exemplary embodiments/variations. In FIG. 4A a wireless (GERAN) network 1 is adapted for communication over a wireless link 11 with an apparatus, such as a mobile communication device which may be referred to as a UE 10, via a network access node, such as a BTS 12 of a GERAN system. The network 1 may include a network control element (BSC) 14 that is in communication with the GERAN core network CN 16, similar to that shown at FIG. 1. The CN 16 provides connectivity of the BTS 12 and BSC 14 with other networks, such as an E-UTRAN network which controls the neighbor E-UTRAN eNBs and/or a broad-based data communications network (e.g., the internet) and/or a publicly switched telephone network. The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the BTS 12 via one or more antennas. The BTS 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The BTS 12 is coupled via a data/control path 13 to the BSC 14. The path 13 may be implemented as the Gb interface shown in FIG. 1. The BTS 12 may also be coupled to another BTS via data/control path 15, which may be implemented as the Iur-g interface shown in FIG. 1.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the BTS 12, or by hardware, or by a combination of software and hardware (and firmware).

For the purposes of describing the exemplary embodiments of this invention the UE 10 may be assumed to also include a reference signal measurement unit 10E which measures the RSRP/RSPQ, associates the individual measurements from individual neighbor cells to a code point, and compiles the code points into a measurement report which is sent to the access node. Further, the BTS 12 or BSC 14 may include a measurement report decoder 12E which receives the measurement report from the receiver 12D, determines the neighbor cell's measurements from the code points, and makes a handover decision based on those neighbor cell measurements. It is noted that deciding NOT to handover the UE to any of the neighbor cells is also a decision, which is made when the reported RSRP/RSPQ is not yet sufficiently strong to justify a handover from the serving access node. Either of the units 10E/12E may be disposed functionally if not logically within the associated DP 10A/12A or 14A, or in any of the more function-specific chips detailed at FIG. 4B.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B or 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A or 14A may be of any type suitable to the local technical environment, and may include one or more of general purpose computers, special purpose computers, microprocessors, digital signal processors (DSPs) and processors based on a multicore processor architecture, as non-limiting examples.

FIG. 4B illustrates further detail of an exemplary UE in both plan view (left) and sectional view (right), and the invention may be embodied in one or some combination of those more function-specific components. At FIG. 4B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 4B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or BTS 12 or BSC 14, may operate in a slave relationship to the main processor 10A, 12A or 14A, which may then be in a master relationship to them. In one particular embodiment of the invention the BB chip 42 delivers the accurate measurement results without range restrictions and the main processor 10A builds the signaling messages at which phase the main processor would implement the rules related to the limited number of code points and the related mapping in view of the step sizes and threshold. However, it is noted that other embodiments need not be disposed among the BB and main processors but may be disposed across individual or various chips and memories as shown or disposed within another processor that combines some of the functions described above for FIG. 4B. Any or all of these various processors of FIG. 4B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 4B.

Note that the various chips (e.g., 38, 40, 42, etc.) that were described above may be combined into a fewer number than described and, in a most compact case, may all be embodied physically within a single chip.

Figure 5:
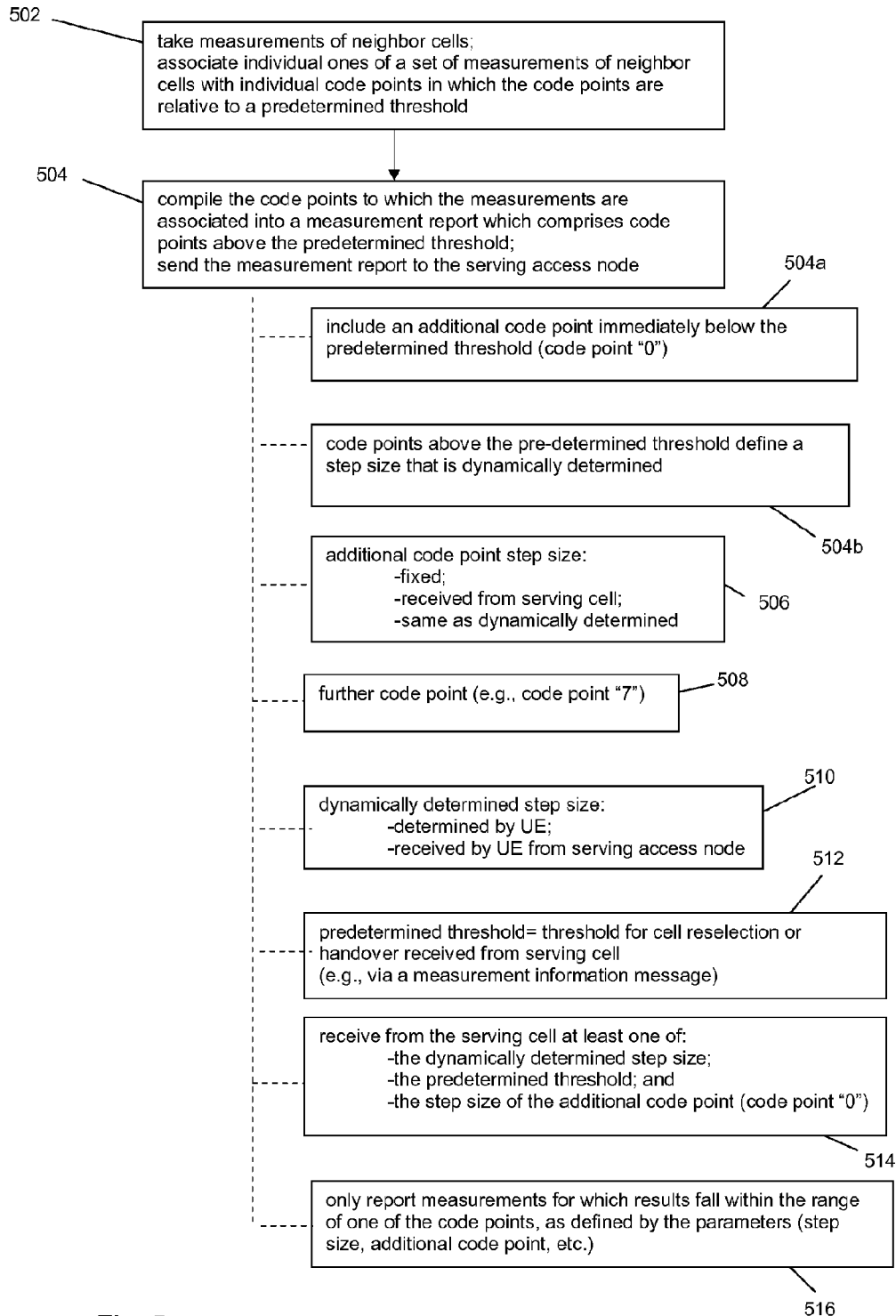
FIG. 5 is a logic flow diagram that illustrates the operation of a method, and a result of execution of computer program instructions embodied on a computer readable memory, in accordance with certain exemplary embodiments of this invention such as for example from the perspective of the user equipment/mobile station which sends the measurement report.

FIG. 5 is a logic flow diagram that illustrates the operation of a method, and a result of execution of computer program instructions, in accordance with the exemplary embodiments of this invention as detailed in the following paragraphs. Based on the foregoing it should be apparent that the exemplary embodiments of this invention provide, from the perspective of the UE or a component thereof, a method, apparatus and computer program(s) to associate individual ones of a set of measurements of neighbor cells with individual code points in which the code points are relative to a predetermined threshold (block 502), and to compile the code points to which the measurements are associated into a measurement report which comprises code points above the predetermined threshold (block 504), in which the measurement report includes at least one of: an additional code point immediately below the predetermined threshold which is associated with measurement report of a further neighbor cell (block 504*a*); and the code points above the pre-determined threshold define a step size that is dynamically determined (block 504*b*).

In further embodiments of the exemplary embodiment from the perspective of the UE summarized above, the measurement report includes both the additional code point immediately below the predetermined threshold (e.g., code point "0") and the code points above the predetermined threshold defined by the dynamically determined step size.

In further embodiments from the perspective of the UE summarized in any of the above paragraphs, the additional code point has a step size that is fixed, or that is received from a serving cell to which the measurement report is sent, or that is the same as the dynamically determined step size for the code points above the pre-determined threshold (each of these are at block 506).

In further embodiments from the perspective of the UE summarized in any of the above paragraphs, the measurement report additionally includes a further code point (e.g., code point "7", see block 508) which is furthest above the predetermined threshold as compared to all other code points in the measurement report (and which is associated with a measurement of a strongest signal relative to any of the said set of measurements), and which has a step size greater than the said dynamically determined step size. In another exemplary embodiment such as shown at FIG. 3 the lowest code point may also have a different step size 302.

In further embodiments from the perspective of the UE summarized in any of the above paragraphs, the dynamically determined step size is determined in the UE based on the set of measurement reports and on the measurement of a strongest signal. In an alternative embodiment to this one, the dynamically determined step size is received by the UE from a serving access node to which the UE sends the measurement report (each of these at block 510), and this step size may be from a set of possible step sizes (e.g., 2 dB and 3 dB).

In further embodiments from the perspective of the UE summarized in any of the above paragraphs, the measurement report includes code points which are restricted only to the additional code point immediately below the predetermined threshold and code points above the predetermined threshold.

In further embodiments from the perspective of the UE summarized in any of the above paragraphs, the UE is in an active mode as opposed to an idle mode.

In further embodiments from the perspective of the UE summarized in any of the above paragraphs, there is a signaled value, received from a serving cell to which the measurement report is sent, from which the UE determines the predetermined value. In a specific embodiment this signaled value is received via dedicated signaling (e.g., via a MEASUREMENT INFORMATION message received from the serving cell, see block 512). In one specific embodiment the received value is the predetermined value (e.g., a cell reselection threshold or a handover threshold), and in another embodiment this received value may be a border value for one of the code points or a nominal value and the UE determines the predetermined value (e.g., the handover/cell reselection value) by offsetting from the received value. The offset between the signaled value/threshold and the predetermined threshold (the actual handover/cell reselection threshold) is illustrated at FIG. 3 where the signaled value/threshold may be 301' and the handover/cell reselection threshold may be 301 which is offset from the signaled threshold 301'.

In further embodiments from the perspective of the UE summarized in any of the above paragraphs, the measurement report is specific to a center frequency on which the measurement reports were taken. In variations on this embodiment, there is received from the serving cell to which the measurement report is sent at least one of: the dynamically determined step size; the predetermined threshold; and the step size of the additional code point (each of these at block 514).

In further embodiments from the perspective of the UE summarized in any of the above paragraphs, the UE includes in its measurement report only those measurements for which results fall within the range defined by one of the code points, as defined by the above parameters (step size, threshold, etc.) as shown at block 516.

In further embodiments from the perspective of the UE summarized in any of the above paragraphs, the neighbor cells include at least one access node of a GERAN system and at least one access node of an E-UTRAN system; and all of the neighbor cells associated with code points in the measurement report are selected for inclusion in the measurement report based on absence from a blacklist stored in a local memory of the UE.

Figure 6:
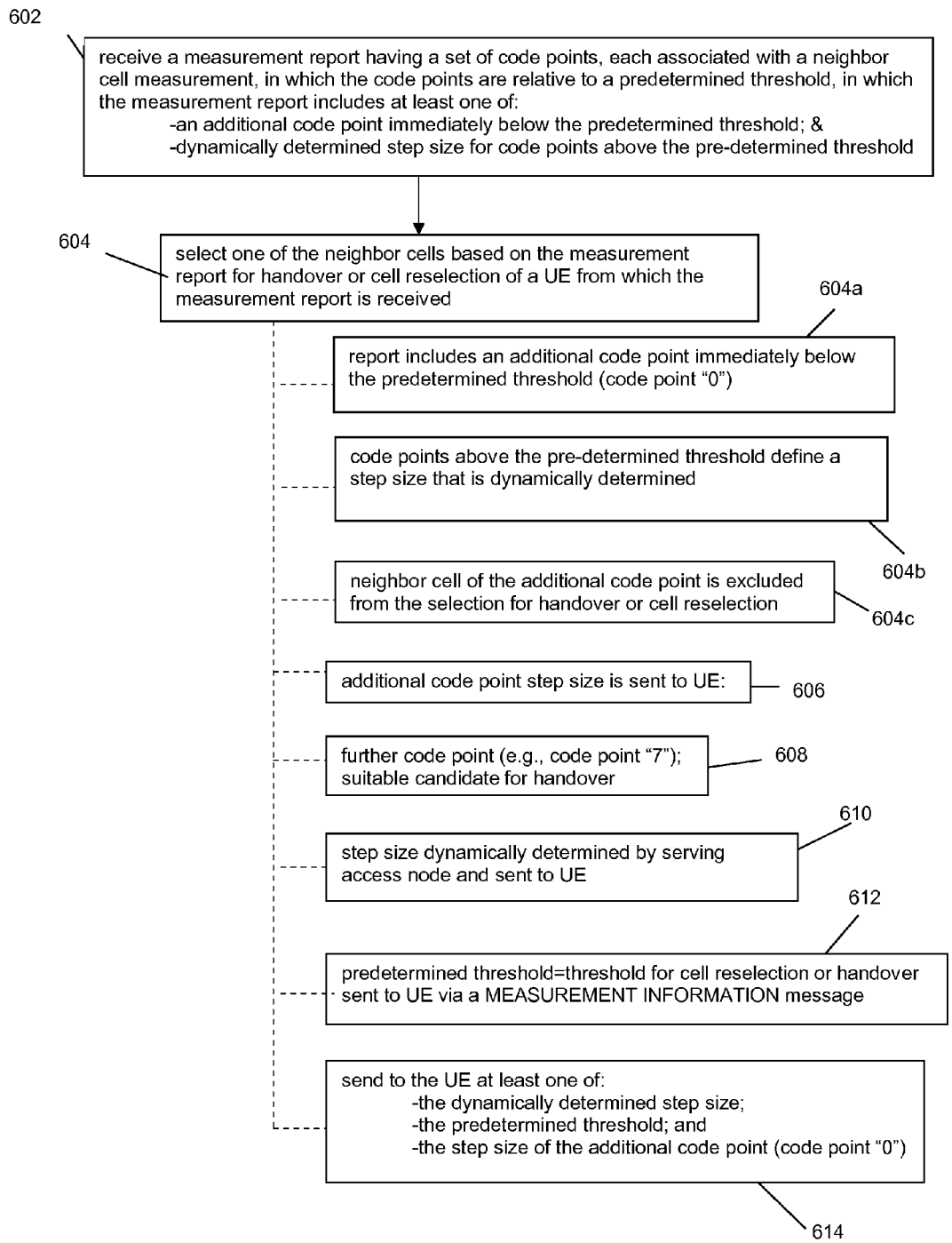
FIG. 6 is a logic flow diagram that illustrates the operation of a method, and a result of execution of computer program instructions embodied on a computer readable memory, in accordance with certain exemplary embodiments of this invention such as for example from the perspective of the network access node which receives the measurement report.

Based on the foregoing it should further be apparent that the exemplary embodiments of this invention provide as shown at FIG. 6, from the perspective of the serving access node (e.g., GERAN BTS) or a component thereof, a method, apparatus and computer program(s) to receive a measurement report (block 602) that comprises a set of code points each of which is associated with individual ones of a set of measurements of neighbor cells, in which the code points are relative to a predetermined threshold, in which the measurement report includes at least one of: an additional code point immediately below the predetermined threshold which is associated with measurement report of a further neighbor cell; and the code points above the pre-determined threshold define a step size that is dynamically determined; and further to select (block 604) one of the neighbor cells based on the measurement report for handover of a UE from which the measurement report is received.

In further embodiments of the exemplary embodiment from the perspective of the access node summarized above, the measurement report includes both the additional code point immediately below the predetermined threshold (e.g., code point "0", see block 604a), and the code points above the pre-determined threshold defined by the dynamically determined step size (block 604b), and the neighbor cell associated with the additional code point (e.g. code point "0") which is temporarily excluded from the selection for handover or cell reselection of the UE (block 604c) but further taken into account in an averaging process related to successive measurement reports at the access node in the same way as for all other reported code points.

In further embodiments from the perspective of the access node summarized in any of the above paragraphs, the additional code point has a step size that the access node sends to the UE (block 606), and this step size may be selected from a set of possible step sizes (e.g., 2 dB and 3 dB).

In further embodiments from the perspective of the access node summarized in any of the above paragraphs, the measurement report additionally includes a further code point (e.g., code point "7") which is furthest above the predetermined threshold as compared to all other code points in the measurement report (and which is associated with a measurement of a strongest signal relative to any of the said set of measurements), and which has a step size greater than the said dynamically determined step size. In this instance the neighbor node associated with the further code point is determined to be suitable for the handover or cell reselection (block 608) or a suitable candidate in case of multiple cells being assigned this code point. In another exemplary embodiment such as shown at FIG. 3 the lowest code point may also have a different step size 302.

In further embodiments from the perspective of the access node summarized in any of the above paragraphs, the dynamically determined step size is determined by the access node and signaled to the UE (block 610).

In further embodiments from the perspective of the access node summarized in any of the above paragraphs, there is a signaled value or threshold, sent by the access node to the UE from which the measurement report is received, and in a specific embodiment this signaled value/threshold is sent via dedicated signaling (e.g., via a MEASUREMENT INFORMATION message sent from the access node, see block 612). In one specific embodiment the signaled value is the predetermined value itself (e.g., a cell reselection threshold or a handover threshold), and in another embodiment this signaled value may be a border value for one of the code points or a nominal value and the predetermined value (e.g., the handover/cell reselection value) is offset from the signaled value. The offset between the signaled value/threshold and the predetermined threshold (the actual handover/cell reselection threshold) is illustrated at FIG. 3 where the signaled value/threshold may be 301' and the handover/cell reselection threshold may be 301 which is offset from the signaled threshold 301'.

In further embodiments from the perspective of the access node summarized in any of the above paragraphs, the measurement report is specific to a center frequency to which the measurement report relates. In variations on this embodiment, prior to receiving the measurement report the access node sends to the UE from which the measurement report is received at least one of: the dynamically determined step size; the predetermined threshold; and the step size of the additional code point (each at block 614).

In further embodiments from the perspective of the access node summarized in any of the above paragraphs, the access node sends to the UE from which the measurement report was received, and prior to receiving that measurement report, a blacklist of neighbor cells, and the measurement report excludes code points associated with any cell on the sent blacklist.

The various blocks shown in FIGS. 5-6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of inter-working among the GERAN and E-UTRAN (UTRAN-LTE) systems, it should be appreciated that the exemplary embodiments of this invention are not limited for use with only inter-working among these particular types of wireless communication systems, and that they may be used to advantage in other wireless communication systems such as for example WLAN, UTRAN, GSM, alone or inter-working with another distinct communication system.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., code point, BSIC, RSRP, RSRQ, etc.) are not intended to be limiting in any respect, as these parameters may be identified by any suitable names. Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
associating individual ones of a set of measurements of neighbor cells with individual code points, in which the code points are relative to a threshold and define a step size that is dynamically determined from a set of possible step sizes;
compiling the code points associated with the measurements of the neighbor cells into a measurement report; and
sending the measurement report to a network.

2. The method according to claim 1, in which the step size defines a granularity for how closely spaced are the code points, and the step size is received from a serving cell to which the measurement report is sent.

3. The method according to claim 1, in which the set of possible step sizes comprises about 2 dB and 3 dB; and the code points define a range for at least one of a reference signal received power and a reference signal received quality.

4. The method according to claim 1, in which there are eight code points indexed zero through seven, and in which each nth code point is bounded by a range extending from a lower code point to n times the step size, in which the higher bound of each range is excluded from the nth code point and n is an integer varying from code points 1 through 7.

5. The method according to claim 1, further comprising:
receiving from a serving cell to which the measurement report is sent a MEASUREMENT INFORMATION message that comprises an offset value; and
determining the threshold from the offset value.

6. The method according to claim 1, in which at least one of the neighbor cells is an access node of an E-UTRAN system; and the neighbor cells associated with code points are selected for inclusion in the measurement report based at least on absence from a blacklist stored in a local memory of a user equipment executing the method.

7. An apparatus comprising:
at least one processor;
at least one memory storing computer readable instructions; the at least one memory and the computer readable instructions configured, with the at least one processor, to cause the apparatus at least to perform:
associate individual ones of a set of measurements of neighbor cells with individual code points, in which the code points are relative to a threshold and define a step size that is dynamically determined from a set of possible step sizes;
compile the code points associated with the measurements of the neighbor cells into a measurement report; and
send the measurement report to a network.

8. The apparatus according to claim 7, in which the step size defines a granularity for how closely spaced are the code points, and the apparatus is further caused to receive the step size from a serving cell to which the measurement report is sent.

9. The apparatus according to claim 7, in which there is one step size that is the substantially same for at least all but two of the code points.

10. The apparatus according to claim 7, in which the set of possible step sizes comprises about 2 dB and 3 dB; and the code points define a range for at least one of a reference signal received power and a reference signal received quality.

11. The apparatus according to claim 7, in which there are eight code points indexed zero through seven, and in which each nth code point is bounded by a range extending from a lower code point to n times the step size, in which the higher bound of each range is excluded from the nth code point and n is an integer varying from code points 1 through 7.

12. The apparatus according to claim 7, wherein the apparatus is a user equipment operating in an active mode.

13. The apparatus according to claim 7, wherein the memory and computer program code are configured to, with the processor, further cause the apparatus to
receive from a serving cell to which the measurement report is sent a MEASUREMENT INFORMATION message that comprises an offset value; and
determine the threshold from the offset value.

14. The apparatus according to claim 7, in which the measurement report is specific to a center frequency on which the measurement reports were taken.

15. The apparatus according to claim 7, in which at least one of the neighbor cells is an access node of an E-UTRAN system;
and the memory further stores a blacklist, and the neighbor cells associated with code points are selected for inclusion in the measurement report based at least on absence from the stored blacklist.

16. An apparatus comprising:
at least one processor;
at least one memory storing computer readable instructions;
the at least one memory and the computer readable instructions configured, with the at least one processor, to cause the apparatus at least to perform:
send a code point step size selected from a set of possible step sizes to a user equipment;
receive from the user equipment a measurement report that comprises a set of code points each of which is associated with individual ones of a set of measurements of neighbor cells, in which the code points are relative to a threshold; and
select, based on the received measurement report, one of the neighbor cells for handover of the user equipment from which the measurement report is received.

17. The apparatus according to claim 16, in which the step size defines a granularity for how closely spaced are the code points; the step size is dynamically determined; and the set of possible step sizes comprises about 2 dB and 3 dB.

18. The apparatus according to claim 16, wherein the memory and computer program code are configured to, with the processor, further cause the apparatus to send to the user equipment a MEASUREMENT INFORMATION message that comprises an offset from which the threshold is determined.

19. The apparatus according to claim 16, in which the threshold is at least one of a handover threshold and a cell reselection threshold.

20. The apparatus according to claim 16, wherein the memory and computer program code are configured to, with the processor, further cause the apparatus to send to the user equipment a blacklist; and in which at least one of the neighbor cells is an access node of an E-UTRAN system, and the neighbor cells associated with code points are selected for inclusion in the measurement report based at least on absence from the blacklist.

* * * * *

UNITED STATES PATENT AND TRADEMARK OFFICE
CERTIFICATE OF CORRECTION

| | | |
|---|---|---|
| PATENT NO. | : 8,725,152 B2 | Page 1 of 1 |
| APPLICATION NO. | : 13/128590 | |
| DATED | : May 13, 2014 | |
| INVENTOR(S) | : Jokinen et al. | |

It is certified that error appears in the above-identified patent and that said Letters Patent is hereby corrected as shown below:

Title Page,
Item (75) Inventors: "Merching, DE (US)" should read --Merching, DE--.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,725,152 B2                                                                Page 1 of 1
APPLICATION NO.    : 13/128590
DATED              : May 13, 2014
INVENTOR(S)        : Jokinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this
Twenty-ninth Day of September, 2015

Michelle K. Lee
*Director of the United States Patent and Trademark Office*